(12) United States Patent
Uesu et al.

(10) Patent No.: US 10,072,705 B2
(45) Date of Patent: Sep. 11, 2018

(54) BEARING DEVICE FOR CRANKSHAFT OF INTERNAL COMBUSTION ENGINE

(71) Applicant: DAIDO METAL COMPANY LTD., Nagoya-shi (JP)

(72) Inventors: Yusuke Uesu, Inuyama (JP); Yasushi Saito, Inuyama (JP)

(73) Assignee: Daido Metal Company Ltd., Nagoya (JP)

(*) Notice: Subject to any disclaimer, the term of this patent is extended or adjusted under 35 U.S.C. 154(b) by 0 days.

(21) Appl. No.: 15/636,693

(22) Filed: Jun. 29, 2017

(65) Prior Publication Data
US 2018/0010631 A1    Jan. 11, 2018

(30) Foreign Application Priority Data

Jul. 6, 2016  (JP) .................................. 2016-134443

(51) Int. Cl.
*F16C 33/66* (2006.01)
*F16C 33/10* (2006.01)
(Continued)

(52) U.S. Cl.
CPC ............ *F16C 33/1065* (2013.01); *F16C 3/04* (2013.01); *F16C 17/022* (2013.01);
(Continued)

(58) Field of Classification Search
CPC ...... F16C 3/04; F16C 3/14; F16C 9/02; F16C 17/022; F16C 33/046; F16C 33/1045;
(Continued)

(56) References Cited

U.S. PATENT DOCUMENTS 6,491,438 B1* 12/2002 Ono .......................... F16C 9/02
                                                   384/288
7,281,854 B2* 10/2007 Terada ..................... F01M 1/06
                                                   384/288
(Continued)

FOREIGN PATENT DOCUMENTS

EP      3173636 A1    5/2017
EP      3228882 A1   10/2017
(Continued)

OTHER PUBLICATIONS

Extended European Search Report issued in corresponding EP Application No. 17179301.1 dated Dec. 12, 2017, 6 pages.
(Continued)

*Primary Examiner* — Alan B Waits
(74) *Attorney, Agent, or Firm* — Snyder, Clark, Lesch & Chung, LLP

(57) ABSTRACT

The provided is a bearing device for a crankshaft of an internal combustion engine including: a crankshaft having a plurality of journal portions; main bearings for supporting the crankshaft; and a bearing housing, wherein a range in which the oil groove of the upper-side halved bearing of the second main bearing is formed in the circumferential direction includes at least a range of a circumferential angle of 20° within the ±45° region, a circumferential end portion of the oil groove on a rotationally forward side communicates with the crush relief at a minimum, and is open to a circumferential end face at a maximum, and a circumferential end portion of the oil groove on the rotationally backward side of the journal portion is positioned on a circumferential center portion side of the upper-side halved bearing from a circumferential end face of the upper-side halved bearing.

5 Claims, 10 Drawing Sheets

(51) Int. Cl.
*F16C 17/02* (2006.01)
*F16C 3/04* (2006.01)

(52) U.S. Cl.
CPC ...... *F16C 33/6666* (2013.01); *F16C 2204/10* (2013.01); *F16C 2204/20* (2013.01)

(58) Field of Classification Search
CPC .............. F16C 33/1065; F16C 33/6666; F16C 2204/10; F16C 2204/20; F01M 1/06; F01M 11/02; F01M 2001/062; F01M 2011/026
See application file for complete search history.

(56) References Cited

U.S. PATENT DOCUMENTS

| | | | | |
|---|---|---|---|---|
| 8,317,401 | B2* | 11/2012 | Matsuyama | F16C 9/02 384/288 |
| 8,608,385 | B2* | 12/2013 | Ovares | F16C 9/02 384/283 |
| 2005/0047689 | A1* | 3/2005 | Yamazaki | F16C 9/02 384/288 |
| 2005/0263125 | A1* | 12/2005 | Terada | F01M 1/06 123/196 R |
| 2010/0316312 | A1* | 12/2010 | Maitani | F16C 9/00 384/288 |
| 2012/0294558 | A1* | 11/2012 | Ovares | F16C 9/02 384/288 |
| 2013/0156358 | A1 | 6/2013 | Ishigo et al. | |
| 2017/0152885 | A1* | 6/2017 | Kato | F01M 11/02 |

FOREIGN PATENT DOCUMENTS

| | | |
|---|---|---|
| JP | H08277831 A | 10/1996 |
| JP | 2006125565 A | 5/2006 |
| JP | 2012112472 A | 6/2012 |
| WO | WO-2004/038188 A1 | 5/2004 |

OTHER PUBLICATIONS

Office Action issued in corresponding EP Application No. 17179301.1 dated May 15, 2018, 6 pages.

* cited by examiner

※RH>RV

※RH<RV

US 10,072,705 B2

BEARING DEVICE FOR CRANKSHAFT OF INTERNAL COMBUSTION ENGINE

INCORPORATION BY REFERENCE

The present application claims priority from JP Patent Application Ser. No. 2016-134443 filed on Jul. 6, 2016, the content of which is hereby incorporated by reference into this application.

BACKGROUND OF THE INVENTION

1. Field of the Invention

The present invention relates to a bearing device for a crankshaft of an internal combustion engine.

2. Description of the Related Art

A crankshaft of a multi-cylinder internal combustion engine has a plurality of journal portions and a plurality of crank pin portions. The plurality of journal portions includes a journal portion A with a lubricating oil passage (hereinafter simply referred to as "journal portion A") for supplying oil to the crank pin portion and a journal portion B without a lubricating oil passage B (hereinafter simply referred to as "journal portion B"). The crankshaft is supported by a cylinder block lower portion of the internal combustion engine through a main bearing A in the journal portion A, and through a main bearing B in the journal portion B. The main bearings A and B have a cylindrical shape with a pair of halved bearings assembled to a bearing holding hole of the bearing housing. The bearing housing includes an upper-side housing which is part of the cylinder block, and a lower-side housing which is a bearing cap. To lubricate the main bearings A and B, oil discharged by the oil pump is fed into an oil groove formed along the inner circumferential surface of the main bearings A and B through an oil gallery formed in the wall of the cylinder block and a through hole formed in the wall of the main bearings A and B. In the journal portion A, the first lubricating oil passage is formed through the journal portion A in the diameter direction, and communicates with the oil groove of the main bearing A at its both end openings. Further, the second lubricating oil passage is branched off from the first lubricating oil passage and is formed so as to pass through the crank arm portion, and communicates with a third lubricating oil passage formed through the crank pin portion in the diameter direction of the crank pin portion. Accordingly, oil fed into the oil groove of the main bearing A passes through the first lubricating oil passage, the second lubricating oil passage, and the third lubricating oil passage. After that, the oil is supplied from the end opening (oil outlet formed on the outer circumferential surface of the crank pin portion) of the third lubricating oil passage to the sliding surface between the crank pin portion and the connecting rod bearing.

The main bearing A and the main bearing B have the same shape. A groove is formed on at least one inner circumferential surface of the pair of halved bearings constituting the main bearings (FIG. 1 in JP 08-277831 A). The oil groove is formed over the circumferential entire length of the halved bearing. In this case, in the main bearing B, oil whose amount exceeds the amount required for lubricating the inner circumferential surface of the main bearing B is supplied.

Regarding the main bearing B, the oil groove of the halved bearing BU on the cylinder block side is removed, and the oil supplied from the outside through the oil hole formed through the inner circumferential surface and outer circumferential surface of the halved bearing BU is caused to flow into the gap between the inner circumferential surface of the main bearing B and the surface of the journal portion B. In this way, a bearing device that reduces the amount of oil supplied to the main bearing B has been proposed (WO 2004/038188). Furthermore, in the main bearing A of the bearing device, the circumferential both end portions of the oil groove which is formed on the inner circumferential surface of one halved bearing AU in the circumferential direction do not communicate with the crush relief formed at the circumferential both end portions of the inner circumferential surface of the halved bearing AU. In this way, the configuration of the oil groove of the halved bearing AU formed as a partial groove structure prevents oil in the oil groove from flowing outside of the main bearing A through the gap due to the crush relief. According to the bearing device of WO 2004/038188, the amount of oil to be supplied to a plurality of main bearings A and B of the bearing device can be reduced. Thus an oil pump can be downsized, and an internal combustion engine with low fuel consumption can be achieved.

The object of JP 2006-125565 A is to overcome the disadvantage of the bearing device (disclosed in FIG. 5) of WO 2004/038188 in which main bearing B is insufficiently cooled, and the durability of the main bearing B decreases. In the bearing device of JP 2006-125565 A, an oil groove is partially formed on the inner circumferential surface of one halved bearing BU of the main bearing B. This oil groove extends in the circumferential direction of the inner circumferential surface including the central position in the circumferential direction of the halved bearing BU and is formed until slightly before the both end portions in the circumferential direction (paragraph [0009]). Thus, since the amount of the oil to be supplied to the inner circumferential surface of the main bearing B can be increased, it is possible to prevent the durability of the main bearing B from deteriorating. In the main bearing A of the bearing device in JP 2006-125565 A, the oil groove is formed over the entire length of the inner circumferential surface of one halved bearing AU. In the bearing device in JP 2006-125565 A, due to the increased amount of oil to be supplied to the main bearings B, an increase in the size of the oil pump is required. Since the oil pump is operated by the rotational force of the crankshaft, the increase in the size of the oil pump is accompanied by an increase in mechanical loss of the internal combustion engine.

Furthermore, in recent years, there is a tendency that in the internal combustion engine for a passenger car, Al alloy is used for its cylinder block for weight reduction. The bearing housing of the main bearings includes an upper housing made of Al alloy, which is a part of the cylinder block, and a lower housing made of the Fe alloy, which is a bearing cap. In cases where this bearing housing is used for the bearing device in JP 2006-125565 A, at the start of the internal combustion engine (in particular, at the time of starting from a state where the bearing device has a low temperature in cold areas), it is difficult to supply oil to the sliding surface of the halved bearing BL which is assembled into the bearing cap made of Fe alloy and which does not form an oil groove. Thus, there is a problem in that seizure occurs on the inner circumferential surface of the halved bearing BL.

The bearing gap for supplying oil are provided between the inner circumferential surface of the main bearing and the surface of the journal portion of a crankshaft. When the bearing gap is too large, axial runout occurs in the crankshaft, causing vibration and noise of the internal combustion engine. When the bearing housing including the upper housing made of Al alloy and the lower housing made of Fe alloy is used, the bearing gap varies due to a temperature change because the Al alloy housing and the journal portion of the crankshaft made of Fe alloy have different coefficients of thermal expansion. While the bearing device for an internal combustion engine for a passenger car is designed such that the bearing gap is narrowed for the quietness of the internal combustion engine at the temperature (e.g., 120° C.) of the bearing housing during normal operation, the bearing gap varies to become further narrower when the temperature of the bearing housing is lowered. Since the internal combustion engine for a passenger car is started in cold areas from the state in which the temperature of the bearing housing is low (for example, about −30° C.), the bearing gap becomes very narrow due to a difference in coefficients of thermal expansion between the Al alloy housing and the Fe alloy crankshaft, and further, the viscosity of the oil is high.

In the bearing device in JP 2006-125565 A, oil in the partial oil groove provided on the inner circumferential surface of the halved bearing BU assembled into upper housing made of Al alloy has a high viscosity, and further, the bearing gap between the inner circumferential surface of the halved bearing BU and the surface of the journal portion is extremely narrow. Thus, oil does not easily flow out from the oil groove to the outside. Therefore, oil is not supplied early to the inner circumferential surface of the other halved bearing BL assembled into the lower housing made of Fe alloy. For this, the inner circumferential surface of the other halved bearing BL causes damage.

SUMMARY OF THE INVENTION

The object of the present invention is to provide a bearing device for a crankshaft of an internal combustion engine wherein oil is supplied early to the bearing gap at the start of the internal combustion engine from a low temperature state, and the amount of oil to be supplied can be reduced during a normal operation.

In order to solve the above-mentioned problems, according to the present invention, a bearing device (1) for a crankshaft of an internal combustion engine includes a crankshaft (3) having a plurality of journal portions (61, 62) and a plurality of crank pin portions (5), main bearings (41, 42) for supporting the crankshaft (3), and a bearing housing (8) for holding the main bearings (41, 42), wherein the plurality of journal portions include a first journal portion (61) having a lubricating oil passage (63a) for feeding oil to a crank pin portion of the crankshaft, and a second journal portion (62) without the lubricating oil passage, wherein the first journal portion (61) is supported by a first main bearing (41), and the first main bearing (41) includes a pair of an upper-side halved bearing (41U) and a lower-side halved bearing (41L) in half-cylindrical shape, wherein the second journal portion (62) is supported by a second main bearing (42), and the second main bearing (42) includes a pair of an upper-side halved bearing (42U) and a lower-side halved bearing (42L) in half-cylindrical shape, wherein the bearing housing (8) includes an upper-side housing (81) made of Al alloy and a lower housing (82) made of Fe alloy, the upper-side housing has a half-cylindrical surface (83a) aligned with an outer circumferential surface of the upper-side halved bearing, the lower-side housing has a half-cylindrical surface (83b) aligned with an outer circumferential surface of the lower-side halved bearing, the upper-side halved bearings (41U, 42U) is held on the half-cylindrical surface (83a) of the upper-side housing, and the lower-side halved bearings (42L, 42L) are held on the half-cylindrical surface (83b) of the lower-side housing, wherein an inner oil passage (G2) for supplying oil to the first and second main bearings is formed inside of the upper-side housing, and an opening (G2c) of the inner oil passage (G2) is formed on the half-cylindrical surface (83a) of the upper-side housing, wherein only the upper-side halved bearings (41U, 42U) out of the pair of halved bearings respectively have oil grooves (41G, 42G) formed on the inner circumferential surface and at least one oil hole (45), wherein the oil hole (45) penetrates a bearing wall thickness of the upper-side halved bearings (41U, 42U), and is open to an outer circumferential surface, wherein the opening (G2c) of the inner oil passage (G2) of the upper-side housing (81) and the oil grooves (41G, 42G) communicate with each other through the oil hole (45), wherein the upper-side and lower-side halved bearings (41U, 41L, 42U, 42L) have a crush relief (70) at circumferential both end portions of the inner circumferential surface thereof, wherein a range in which the oil groove (41G) of the upper-side halved bearing (41U) of the first main bearing (41) is formed in a circumferential direction is such that each of circumferential both end portions of the oil groove (41G) communicates with the crush relief (70) at a minimum, and is open to a circumferential end face (72) of the upper-side halved bearing (41U) at a maximum, wherein when a region of a circumferential angle of ±45° is defined as ±45° region (θ1) with reference to a circumferential center portion of the upper-side halved bearing (41U, 42U), a range in which the oil groove (42G) of the upper-side halved bearing (42U) of the second main bearing (42) is formed in the circumferential direction includes at least a range of a circumferential angle of 20° within the ±45° region (θ1), a circumferential end portion of the oil groove (42G) on a rotationally forward side of the journal portion (62) communicates with the crush relief (70) of the upper-side halved bearing (42U) on the rotationally forward side of the journal portion (62) at a minimum, and is open to a circumferential end face (72) of the upper-side halved bearing (42U) on the rotationally forward side of the journal portion (62) at a maximum, and a circumferential end portion of the oil groove (42G) on the rotationally backward side of the journal portion (62) is positioned on a circumferential center portion side of the upper-side halved bearing (42U) from a circumferential end face (72) of the upper-side halved bearing (42U) on the rotationally backward side of the journal portion (62), (the circumferential end portion of the oil groove (42G) on the rotationally backward side of the journal portion (62) is positioned at the crush relief (70) or the inner circumferential surface (a sliding surface) (71)), wherein a groove depth (D2) at least in the ±45° region (θ1) of the oil groove (42G) of the upper-side halved bearing (42U) of the second main bearing (42) is half or less of a groove depth (D1) in the ±45° region (θ1) of the oil groove (41G) of the upper-side halved bearing (41U) of the first main bearing (41).

The term, "upper-side" and "lower-side", does not limit the arrangement of the present invention, and the arrangement of the present invention can be made in any orientation.

The previous description stating that the circumferential end portion of the oil groove 42G on a rotationally forward side of the journal portion 62 communicates with the crush relief 70 of the upper-side halved bearing 42U on the rotationally forward side of the journal portion 62 at a minimum, and is open to a circumferential end face 72 of the upper-side halved bearing 42U on the rotationally forward side of the journal portion 62 at a maximum, and a range in which the oil groove 42G is formed in the circumferential direction includes at least a range of a circumferential angle of 20° within the ±45° region θ1, means that an oil groove 42G is formed in at least a range of the circumferential angle of 20° from the boundary of the ±45° region θ1 on the rotationally forward side of the journal portion.

In another embodiment of the present invention, the groove depth (D2) of the oil groove (42G) of the upper-side halved bearing (42U) of the second main bearing (42) is, over the circumferential entire length (at any position in the circumferential direction), half or less of the groove depth (D1) of the oil groove (41G) of the upper-side halved bearing (41U) of the first main bearing (41) at a position corresponding to the circumferential direction.

In another embodiment of the present invention, the groove depth (D2) of the oil groove (42G) of the upper-side halved bearing (42U) of the second main bearing (42) is 0.5 mm at a maximum at least in the ±45° region (θ1).

Further, in another embodiment of the present invention, the groove depth (D2) of the oil groove (42G) of the upper-side halved bearing (42U) of the second main bearing (42) becomes smallest at a circumferential end portion on the rotationally backward side of the second journal portion (62), and increases toward a circumferential end portion on the rotationally forward side of the second journal portion (62).

Further, in another embodiment of the present invention, the groove depth (D2) of the oil groove (42G) of the upper-side halved bearing (42U) of the second main bearing (42) becomes largest at a center portion of a circumferential length of the oil groove (42G), and decreases toward the circumferential both end portions.

According to the present invention, the oil groove 42G of the upper-side halved bearing 42U of the second main bearing 42 for supporting the second journal portion 62 is formed to include at least a range of a circumferential angle of 20° in the ±45° region θ1 in which the change in the gap between the groove bottom surface of the oil groove 42G and the surface of the second journal portion 62 is large, when there is a change in the temperature of the bearing device 1 (bearing housing 8), and the groove depth D2 of the oil groove 42G of the upper-side halved bearing 42U is, at least in the ±45° region θ1, made to be half or less of the groove depth D1 in the ±45° region θ1 of the oil groove 41G of the upper-side halved bearing 41U of the first main bearing 41 for supporting the first journal portion 61. For this reason, at the time of starting the internal combustion engine from a low temperature state (for example, −30° C.) in cold areas, the gap between the groove bottom surface in the ±45° region θ1 of the oil groove 42G of the upper-side halved bearing 42U for supporting the second journal portion 62 and the surface of the second journal portion 62 becomes narrower, and oil in the oil groove 42G is heavily affected by the force from the surface of the journal portion 62 to be forcibly sent forward in the shaft rotation direction in the oil groove 42G. During this time, the oil is sheared, the temperature rises early, and the viscosity is lowered.

At the time of starting the internal combustion engine from a low temperature state, the bearing gap between the surface of the second journal portion 62 and the inner circumferential surface 71 of the second main bearing 42 is extremely narrow. However, oil whose viscosity becomes low is early sent from inside the oil groove 42G to the bearing gap between the inner circumferential surface 71 of the lower-side halved bearing 42L accommodated in the lower-side housing 82 made of Fe alloy and the surface of the second journal portion 62.

On the other hand, during the normal operation of the internal combustion engine, when the temperature of the bearing device 1 is increased, the gap between the groove bottom surface of the oil groove 42G of the upper-side halved bearing 42U and the surface of the second journal portion 62 increases, and oil in the oil groove is hardly affected by the force by the journal portion which rotates. Thus, oil is unlikely to flow out excessively from the oil groove 42G to a gap between the inner circumferential surface of the upper-side halved bearing 42U and the surface of the second journal portion 62, or a gap between the inner circumferential surface of the lower-side halved bearing 42L and the surface of the second journal portion 62. Since the groove depth of the oil groove 42G of the upper-side halved bearing 42U is configured to be half or less of the groove depth of the oil groove 41G of the upper-side halved bearing 41U of the first main bearing 41, the internal volume of the oil groove 42G is reduced. Since the amount of oil supplied to the second main bearing 42 is small, the size of the oil pump can be reduced.

DESCRIPTION OF THE EMBODIMENTS

EXAMPLE 1

Figure 1:
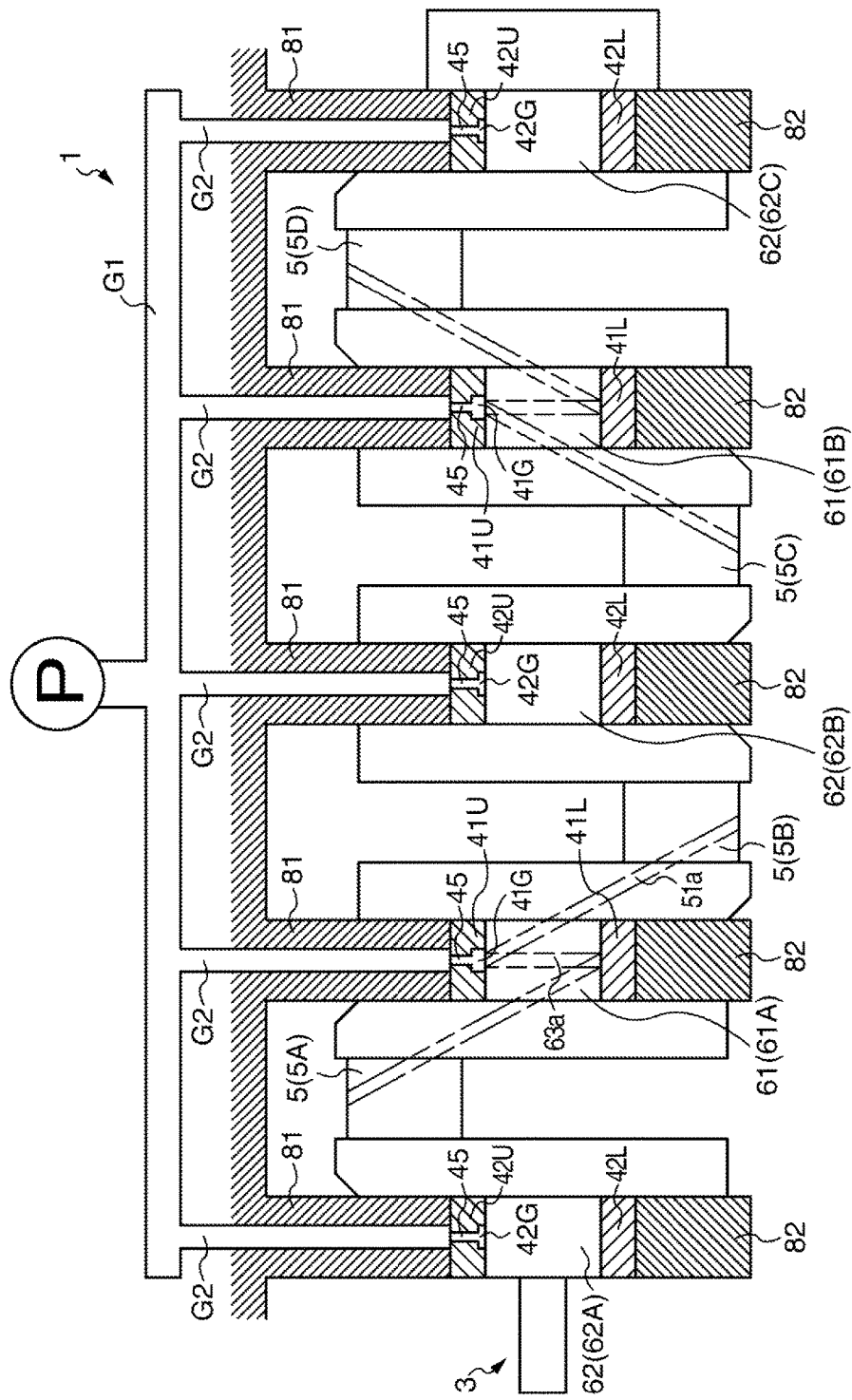
FIG. 1 is a schematic diagram of a bearing device of a crankshaft.
Figure 2:
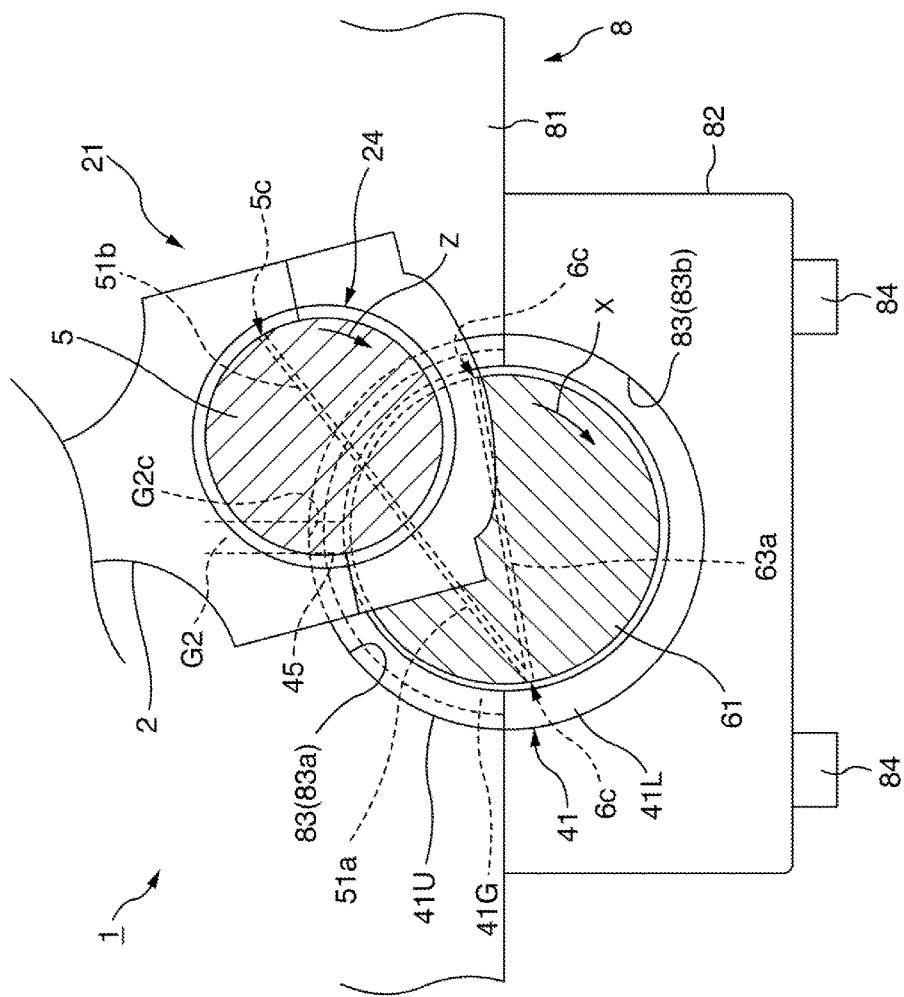
FIG. 2 is a front view of a first journal portion having a lubricating oil passage.
Figure 3:
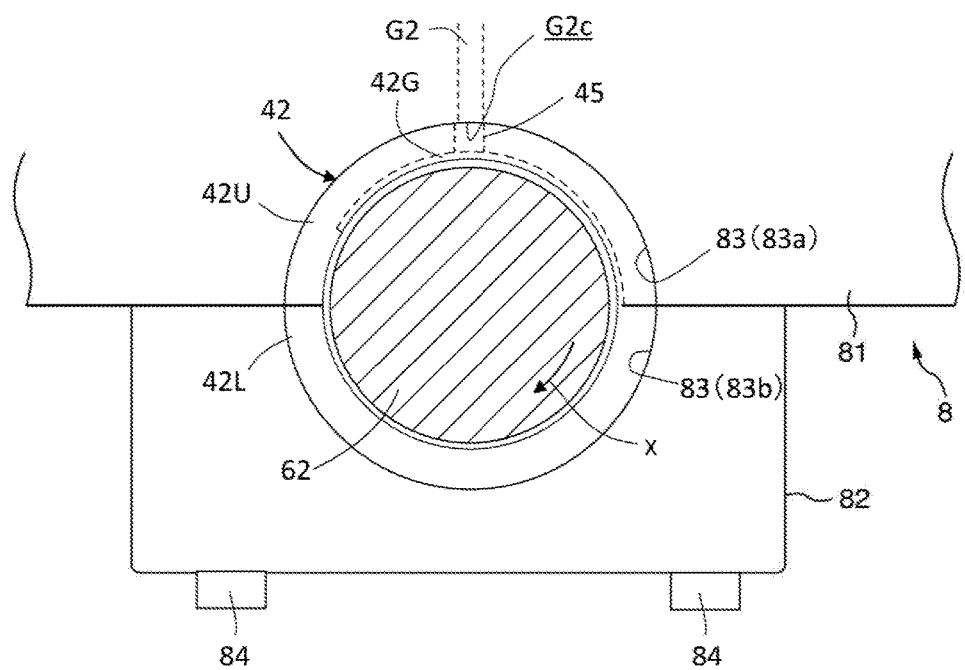
FIG. 3 is a front view of a second journal portion without a lubricating oil passage.

FIG. 1 is a schematic view of a bearing device 1 of the crankshaft 3 of the present invention as applied to an in-line four-cylinder internal combustion engine. FIG. 2 shows a bearing structure of journal portions 61 (No. 2 and No. 4 journal portions (61A, 61B) in FIG. 1) having a lubricating oil passage 63a for supplying oil to the crank pin portion 5 of the bearing device 1 shown in FIG. 1. (hereinafter, "journal portion with a lubricating oil passage" will be referred to as "first journal portion") FIG. 3 shows a bearing structure of a journal portion 62 (No. 1, No. 3, and No. 5 journal portions (62A, 62B, 62C) in FIG. 1) without a lubricating oil passage for supplying oil to the crank pin portion 5 of the bearing device 1 shown in FIG. 1. (hereinafter, "journal portion without a lubricating oil passage" is referred to as "second journal portion")

(Overall Configuration of Bearing Device)

As shown in FIG. 1, the bearing device 1 of the present example includes five journal portions 6 (61A, 61B, 62A, 62B, and 62C) which are supported by a cylinder block, and a crankshaft 3 having four crank pin portions 5 (5A to 5D). Crank pin portions 5 are integrally formed with the journal portions 6 between the respective journal portions 6, and rotate around the journal portions 6. The bearing device 1, as a slide bearing for supporting the crankshaft 3, further includes five main bearings 4 for rotatably supporting the respective journal portions 6 (61A, 61B, 62A, 62B, and 62C), and four connecting rods 21 and four connecting rod bearings 24 (not shown in FIG. 1) for rotatably supporting the respective crank pin portions 5 (5A to 5D). The crankshaft 3 of a small internal combustion engine for a passenger car is made of Fe alloy, and the diameter of the journal portion 6 is about 40 mm to 100 mm. A plurality of journal portions 6 usually have the same diameter.

The first main bearing 41 for supporting the first journal portion 61 includes a pair of halved bearings (an upper-side halved bearing 41U and a lower-side halved bearing 41L), and the second main bearing 42 for supporting the second journal portion 62 includes a pair of halved bearings (an upper-side halved bearing 42U and a lower-side halved bearing 42L). The halved bearing includes a back metal layer made of Fe alloy and a bearing alloy layer (Al alloy, Cu alloy, etc.). The main bearings 41 and 42 are made to have an inner diameter corresponding to the diameter of the journal portion, and the wall thickness is about 1.5 mm to 3.0 mm.

In the cylinder block made of Al alloy, the bearing housing 8 is provided at a position corresponding to the journal portion 6. The bearing housing 8 includes an upper-side housing 81 made of Al alloy, which is part of the cylinder block, and a lower-side housing 82, which is a bearing cap made of Fe alloy. The upper-side housing 81 and the lower-side housing 82 have half-cylindrical surfaces 83a and 83b aligned with halved bearings 41U, 41L, 42U and 42L, and a bearing holding hole 83 having the cylindrical shape is formed when the upper-side housing 81 and the lower-side housing 82 are integrally fastened by bolts 84.

The main bearing 41 and 42 having the cylindrical shape is held in the bearing holding hole 83.

Oil discharged by the oil pump P is sent to the oil gallery G1 formed in the cylinder block wall, and further fed to five inner oil passages G2 branched off from the oil gallery G1. An inner oil passage G2 is open to a half-cylindrical surface 83a of the upper-side housing 81. Oil flowing out of the opening G2c of the inner oil passage G2 is fed into the oil groove 41G and 42G formed on the inner circumferential surface of the main bearing 41 and 42 through an oil hole 45 formed through the wall of the main bearing 41 and 42.

FIG. 1 shows the bearing device 1 of the crankshaft 3 of the four-cylinder internal combustion engine. As shown in FIG. 1, numbers from No. 1 to No. 5 toward the rear (Rr) side from the front (Fr) side are given to respective five journal portions 6 of the crankshaft 3, and numbers from No. 1 to No. 4 toward the rear (Rr) side from the front (Fr) side are given to four crank pin portions 5. The first lubricating oil passage 63a is formed through No. 2 and No. 4 journal portions 61A and 61B in the diameter direction of the journal portion, and the second lubricating oil passage 51a which is branched from the first lubricating oil passage 63a is formed through a crank arm portion. The second lubricating oil passage 51a communicates with the third lubricating oil passage 51b which is formed through the No. 1 to No. 4 crank pin portions 5A to 5D in the diameter direction of the No. 1 to No. 4 crank pin portions 5A to 5D. The lubricating oil passage is not formed through the Nos. 1, 3, and 5 journal portions 62A, 62B and 62C. As long as the crankshaft 3 has a plurality of journal portions 6, and the lubricating oil passage 63a is not formed inside at least one journal portion, any configuration can be applied without limited to the configuration shown in FIG. 1.

In FIG. 2, the positional relationship in the depth direction of the space is such that the first journal portion 61 is placed on the back side of the space, and the crank pin portion 5 is placed on the front side of the space.

The first journal portion 61, through the first main bearing 41, is supported by the cylinder block made of Al alloy of the internal combustion engine, and the first main bearing 41 is constituted by a pair of the upper-side halved bearing 41U and the lower-side halved bearing 41L. The upper-side halved bearing 41U has an oil groove 41G on its inner circumferential surface over the circumferential entire length. The first journal portion 61 has a lubricating oil passage 63a which penetrates the first journal portion 61 in the radial direction. When the first journal portion 61 rotates in the arrow X direction, both end openings 6c of the lubricating oil passage 63a communicate with the oil groove 41G of the first main bearing 41 alternately.

The crank pin portion 5 is supported by the big end housing 21 of the connecting rod 2 through the connecting rod bearing 24 constituted by the pair of halved bearings.

As described above, regarding the first main bearing 41, lubricating oil discharged by the oil pump P is fed, from the inner oil passage G2 formed in the cylinder block wall, through the oil hole 45 formed through the wall of the upper-side halved bearing 41U, into the oil groove 41G which is formed on the inner circumferential surface of the upper-side halved bearing 41U over the circumferential entire length.

Furthermore, the first lubricating oil passage 63a is formed through the first journal portion 61 in the diameter direction of the first journal portion 61, and both end openings 6c of the first lubricating oil passage 63a communicate with the lubricating oil groove 41G. Branching off from the first lubricating oil passage 63a of the first journal portion 61, a second lubricating oil passage 51a passing through the crank arm portion (not shown) is formed, and the third lubricating oil passage 51b is formed through the crank pin portion 5 in the diameter direction of the crank pin portion 5.

In this way, oil, through the first lubricating oil passage 63a and the second lubricating oil passage 51a, is supplied to the gap formed between the crank pin portion 5 and the connecting rod bearing 24 from the discharge port 5c at the end of the third lubricating oil passage 51b.

As shown in FIG. 3, the second journal portion 62, through the second main bearing 42, is supported by the cylinder block made of Al alloy of the internal combustion engine, and the second main bearing 42 is constituted by a pair of the upper-side halved bearings 42U and the lower-side halved bearing 42L. The upper-side halved bearing 42U has the oil groove 42G on its inner circumferential surface over the circumferential entire length.

As described above, regarding the second main bearing 42, the lubricating oil discharged by the oil pump P, through oil holes 45 formed through the wall of the upper-side halved bearing 42U, is fed into the oil groove 42G formed on the inner circumferential surface of the upper-side halved bearing 42U from the inner oil passage G2 formed in the cylinder block wall.

Figure 4:
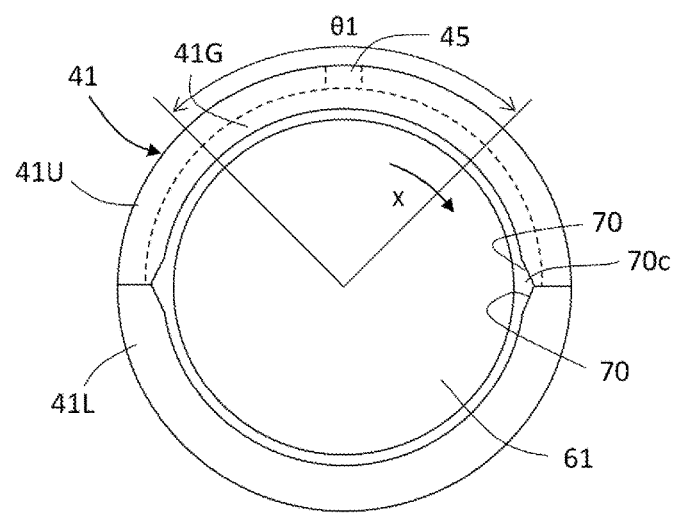
FIG. 4 is a front view of the first main bearing shown in FIG. 2.
Figure 5:
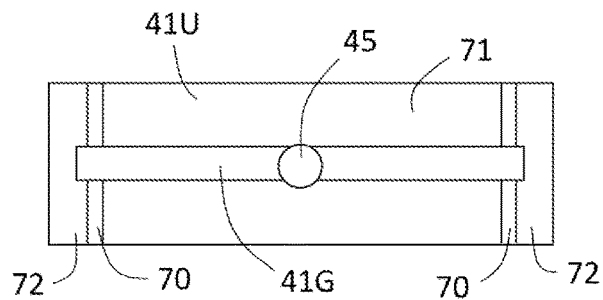
FIG. 5 is a view showing the inner circumferential surface of the upper-side halved bearing shown in FIG. 4.

FIG. 4 shows a front view of the first main bearing 41 for supporting the first journal portion 61 shown in FIG. 2. FIG. 5 shows the inner surface of the upper-side halved bearing 41U.

A crush relief 70 is formed in a region adjacent to the respective end faces 72 of the upper-side and lower-side halved bearings 41U and 41L in the circumferential direction of the upper-side and lower-side halved bearings 41U and 41L. The crush relief 70 is a wall thickness decreasing region which is formed such that the wall thickness of the crush relief 70 is thinner than the original inner circumferential surface 71 (major arc). The crush relief 70 is formed to provide a crush relief gap 70c for absorbing a positional deviation and deformation of the butt end face (circumferential end face 72) in a state where a pair of halved bearings 41U and 41L are assembled to the bearing housing 8 (see, for example, SAE J506 (item 3.26 and item 6.4), DIN1497 (section 3.2), JISD3102). Generally, in the case of a bearing for a small internal combustion engine of a passenger car, the depth of the crush relief at the circumferential end face of the halved bearing (distance from the original inner circumferential surface to the actual inner circumferential surface) is about 0.01 to 0.075 mm, and the length (vertical length from the circumferential end face of the halved bearing to the upper edge of the crush relief 70 with respect to the end face) is about 3 to 7 mm. The crush relief 70 is also formed on the upper-side and lower-side halved bearings 42U and 42L constituting the second main bearing 42 and is the same as that of the upper-side and lower-side halved bearings 41U and 41L.

In Example 1, the upper-side halved bearing 41U has the oil groove 41G on its inner circumferential surface over the circumferential length. In Example 1, the groove depth D1 of the oil groove 41G and the length of the oil groove 41G in the axial direction (width of the oil groove 41G) are made to have substantially uniform size over the circumferential direction of the upper-side halved bearing 41U. When the diameter of the journal portion of the crankshaft 3 of the small internal combustion engine is 40 to 100 mm, the depth D1 of the groove 41G is about 1 mm to 2.5 mm. The larger the diameter of the journal portion is, the larger the oil groove 41G of the groove depth D1 is.

Further, the oil groove 41G has an oil hole 45 penetrating the wall of the upper-side halved bearing 41U. In this Example, one oil hole 45 is formed at the circumferential central position and the axial central position of the upper-side halved bearing 41U. The diameter of the opening 6c of the first lubricating oil passage 63a on the surface of the journal portion 61 is generally about 3 to 8 mm, and the length of the oil groove 41G in the axial direction is slightly larger than the diameter of the opening 6c of the lubricating oil passage 63a. Further, when the oil hole 45 has a circular shaped opening as shown in Example 1, the diameter of the opening is slightly larger than the length of the oil groove 41G in the axial direction.

Since the oil groove 41G is formed over the entire length of the inner circumferential surface, one of the two openings 6c of the lubricating oil passage 63a communicate with the oil groove 41G, and thus oil is supplied to the crank pin portion 5 at all times.

Unlike this Example, oil groove 41G may be changed such that circumferential both end portions of the oil groove 41G are positioned at the crush relief 70. Alternatively, one circumferential end portion of the oil groove 41G may be positioned at the crush relief, and the other end portion may be positioned at the circumferential end face 72 of the upper-side halved bearing 41U. The oil groove 41G may have the maximum length of the oil groove in the axial direction in the vicinity of the circumferential center portion of the oil groove 41G, and may have a smaller length toward the both end portions of the oil groove 41G in the circumferential direction. The oil groove 41G may have the maximum groove depth D1 in the vicinity of a circumferential center portion of the oil groove 41G, and may have a smaller depth toward the both end portions of the oil groove 41G in the circumferential direction. The oil groove 41G may have the maximum groove depth D1 at one circumferential end portion of the oil groove 41G, and may have a smaller depth toward the other end portion of the oil groove 41G in the circumferential direction.

The lower-side halved bearing 41L has the same size and shape as the upper-side halved bearing 41U, except that the lower-side halved bearing 41L does not have the configuration of the oil groove 41G and the oil hole 45.

In the bearing device 1 shown in FIG. 1, No. 2, and No. 4 journal portions 61A and 61B have the main bearings 41 having the same size and shape.

Figure 6:
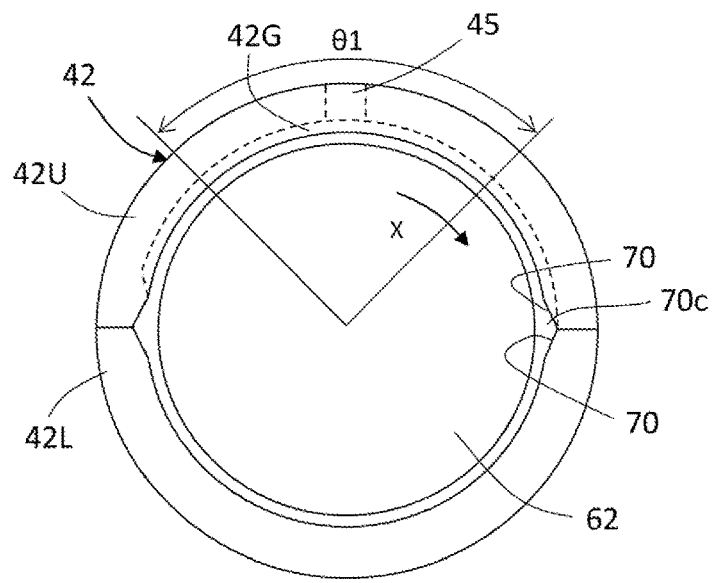
FIG. 6 is a front view of the second main bearing shown in FIG. 3.
Figure 7:
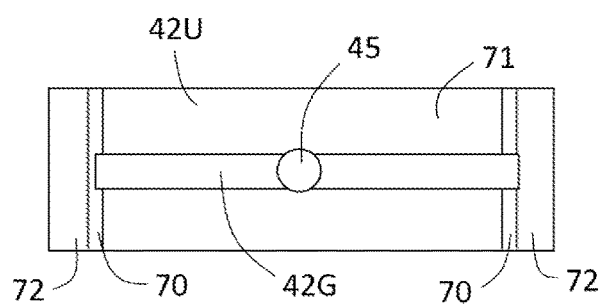
FIG. 7 is a view showing the inner circumferential surface of the upper-side halved bearing 42U shown in FIG. 6.

FIG. 6 shows a front view of the second main bearing 42 for supporting the second journal portion 62 shown in FIG. 3. FIG. 7 shows the inner surface of the upper-side halved bearing 42U.

The second main bearing 42 is constituted by a pair of the upper-side halved bearing 42U and the lower-side halved bearing 42L. The upper-side halved bearing 42U and the lower-side halved bearing 42L is made to have a half-cylindrical shape having a bearing inner diameter, a bearing outer diameter, and a bearing width which are the same those of a pair of the upper-side and lower-side halved bearings and 41U and 41L, and each crush relief 70 is also made to have the same dimension. Further, the upper-side halved bearing 42U has the same sized oil hole 45 as the upper-side halved bearing 41U.

The inner circumferential surface of the upper-side halved bearing 42U has the oil groove 42G extending in the circumferential direction. The circumferential end portion of the oil groove 42G on the rotationally forward side of the crankshaft is made to be open to the circumferential end face 72 of the upper-side halved bearing 42U on the rotationally forward side of the crankshaft, and the circumferential end portion of the oil groove 42G on the rotationally backward side of the crankshaft is made to communicate with the crush relief 70 of the upper-side halved bearing 42U on the rotationally backward side of the crankshaft. The groove depth of the oil groove 42G is made to be constant except near the rotationally backward side of the crankshaft, and the length of the groove in the axial direction (width of the groove) is made to be constant.

Formation range of the oil groove 42G includes all of the region θ1 of a circumferential angle of ±45° (hereinafter, referred to ±45° region θ1) with reference to the circumferential center portion of the upper-side halved bearing 42U. The ±45° region θ1 is a region where change in the gap between the surface of the second journal portion 62 and the groove bottom surface (inner surface) of the oil groove 42G is large when there is a temperature change in the bearing device 1 (bearing housing 8), as described below. Without being limited by this, the formation range of the oil groove 42G may be modified to include at least a range of a circumferential angle of 20° in ±45° region θ1.

Figure 8:
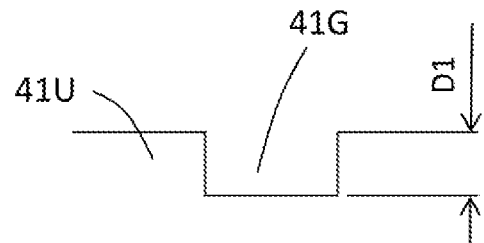
FIG. 8 is a cross-sectional view of the oil groove of the upper-side halved bearing.

The groove depth D2 (See FIG. 9) of the oil groove 42G of the upper-side halved bearing 42U of the second main bearing 42 is made to be half or less of the groove depth D1 (See FIG. 8) of the oil groove 41G of the upper-side halved bearing 41U of the first main bearing 41. For example, when the oil groove 41G has a groove depth D1 of 1.0 mm, the oil groove 42G has a groove depth D2 of 0.5 mm or less. As shown in FIGS. 4 and 6, in Example 1, the above relationship between the groove depth D2 of the groove 42G and the groove depth D1 of the oil groove 41G is held over the circumferential entire length of the oil groove 42G of the upper-side halved bearing 42. Without being limited by this, at least in ±45° region θ1, the relationship between the oil groove 42G and the oil groove 41G may be held. The groove depth D2 of the oil groove 42G is a distance between the inner circumferential surface 71 of the upper-side halved bearing 42U and the bottom surface of the oil groove. The groove depth D2 of the oil groove 42G at the crush relief 70 portion of the upper-side halved bearing 42U is a distance between the imaginary inner circumferential surface, which is determined by extending the inner circumferential surface 71 to the crush relief 70 portion, and the groove bottom surface.

The groove width of the oil groove 42G of this Example is made to be equal to the groove width of the oil groove 41G. Without being limited by this, the groove width of the oil groove 42G may be smaller than, or greater than the groove width of the oil groove 41G. Further, the groove width of the oil groove 42G is made to vary in the circumferential direction.

Preferably, the groove depth D2 of the oil groove 42G in ±45° region θ1 is not less than 0.1 mm at a maximum. Further, even when the depth D1 of the oil groove 41G exceeds 1.0 mm, the groove depth of the oil groove 42G is preferably 0.5 mm or less. As will be described later, the reason is that oil in the oil groove 42G at low temperature is suitably sheared, the groove volume can be reduced, and the supply amount of oil can be reduced during operation.

In the bearing device 1 shown in FIG. 1, the second main bearings 42 of No. 1, No. 2, and No. 3 journal portions 62A, the 62B and 62C without the lubricating oil passage has the same dimension and shape with each other. The second main bearing 42 has the same outer diameter, the inner diameter, and the bearing width (the length in the axial direction) as first main bearing 41 of No. 2, and No. 4 journal portions of 61A and 61B. The main bearings 41 and 42 may have different outer diameters, different inner diameters, and different bearing widths with each other for each journal portion.

The bearing housing including the upper-side housing made of Al alloy and the lower housing made of Fe alloy will be described. The upper-side housing 81 and the lower-side housing 82 of the bearing housing 8 are processed at room temperature (for example, about 20° C.) in a state where they are fastened by the bolts 84 made of Fe alloy, and the bearing holding hole 83 having the cylindrical shape for holding the main bearing 4 is formed (see FIG. 10A). After that, the bolts 84 are loosened, and the upper-side halved bearings 41U and 42U, and the lower-side halved bearings 41L and 42L are assembled into the half-cylindrical surface 83a of the upper-side housing 81 and the half-cylindrical surface 83b of the lower-side housing 82 respectively. The journal portion 6 of the crankshaft is disposed on the inner diameter portion of the upper-side halved bearings 41U and 42U, and the lower-side halved bearings 41L and 42L. Then, the upper-side housing 81 and the lower-side housing 82 are again fastened by the bolts, and the main bearings 41 and 42 are retained in the bearing holding hole 83 of the bearing housing 8.

Figure 10A:
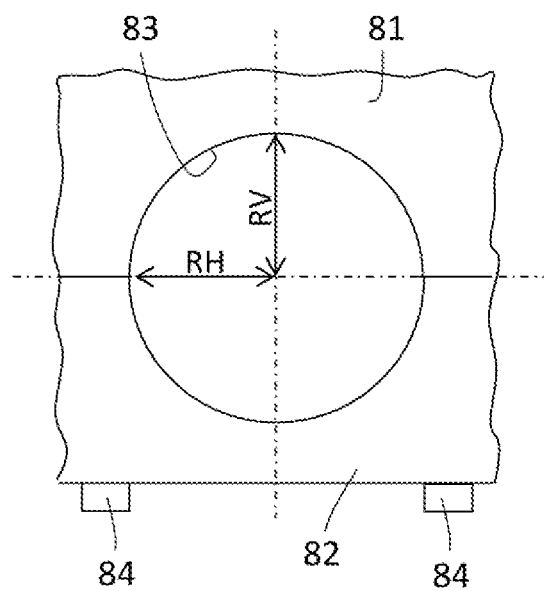
FIG. 10A is a view showing changes in the bearing holding hole of the bearing housing 8.
Figure 10B:
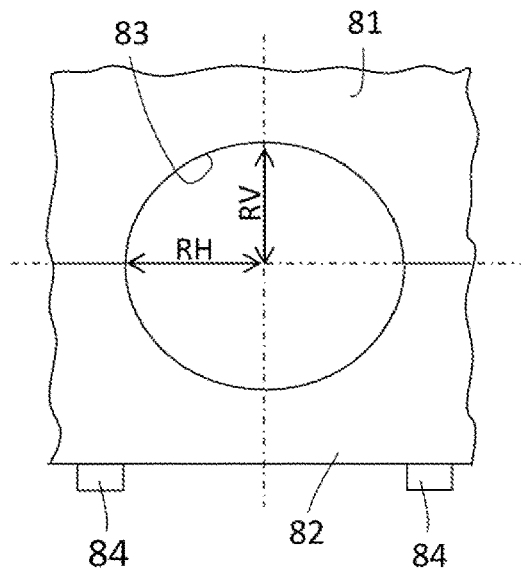
FIG. 10B is a view showing changes in the bearing holding hole of the bearing housing 8.
Figure 10C:
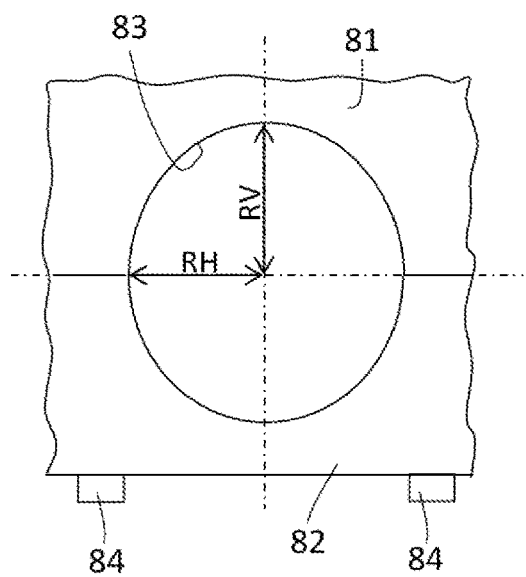
FIG. 10C is a view showing changes in the bearing holding hole of the bearing housing 8.

When the temperature is changed, the upper-side housing 81 and the lower-side housing 82 have different amount of expansion deformation or different amount of shrinkage deformation due to difference in their coefficients of thermal expansion. FIGS. 10A to C show variations of the bearing holding hole 83 of the bearing housing 8 when the temperature changes.

FIG. 10A shows a bearing holding hole 83 of the bearing housing 8 when the temperature of the bearing device is about 20° C. With respect to the half-cylindrical surface of the upper-side housing 81 made of Al alloy, the inner diameter RH parallel to the butt end face of the upper-side housing and the inner diameter RV vertical to the butt end face has the same value.

FIG. 10B shows the bearing holding hole 83 of the bearing housing 8 assuming that the bearing device 1 is placed on −30° C. in cold climate areas. With respect to the half-cylindrical surface 83a of the upper-side housing 81, the inner diameter RV vertical to the butt end face is smaller than the radius RH parallel to the butt end face of the upper-side housing 81.

The reason for this is as follows. When bearing housing 8 is contracted and deformed according to a change in temperature from about 20° C. (FIG. 10A) to −30° C. (FIG. 10B), the shrinkage deformation amount of the upper-side housing 81 is greater than the shrinkage deformation amount of the lower-side housing 82. Al alloy housing and Fe alloy housing, which have relatively different coefficients of thermal expansion, are fastened by bolts, and compressive stress vertical to the butt end face is generated in the vicinity of butt end face of each housing. The butt end face of the lower-side housing 82 made of Fe alloy, which has a relatively low coefficient of thermal expansion, serves as a resistance against shrinkage deformation in the vicinity of the butt end face of the upper-side housing 81 made of Al alloy, which has a relatively high coefficient of thermal expansion. Therefore, while the heat shrinkage of the upper-side housing 81 is suppressed near the butt faces with the lower-side housing 82, the thermal contraction amount increases, by reduction in heat shrinkage near the butt end face, in the region of the circumferential angle of ±45° with reference to the circumferential center portion of the half-cylindrical surface 83a of the upper-side housing 81, which is not affected by the compressive stress by bolting.

FIG. 10C shows a bearing holding hole 83 of the bearing housing 8 assuming that the bearing device 1 has a temperature of 120° C. during normal operation of an internal combustion engine. With respect to the half-cylindrical surface of the upper-side housing 81 made of Al alloy, the inner diameter RV vertical to the butt end face is larger than the inner diameter RH parallel to the butt end face of the upper-side housing.

When the bearing housing 8 (whose temperature rises due to operation of the internal combustion engine) has a temperature of 120° C., the butt end face of the lower-side housing 82 made of Fe alloy, which has a relatively low coefficient of thermal expansion, serves as a resistance against expansion deformation in the vicinity of the butt end face of the upper-side housing 81 made of Al alloy, which has a relatively high coefficient of thermal expansion. Therefore, while the heat expansion of the upper-side housing 81 is suppressed near the butt face with the lower-side housing 82, the thermal contraction amount increases, by reduction in heat expansion near the butt end face, in the region of the circumferential angle of ±45° with reference to the circumferential center portion of the half-cylindrical surface 83a of the upper-side housing 81, which is not affected by the compressive stress by bolting.

It will be understood that when a pair of the upper-side and lower-side halved bearings 42U and 42L and the second journal portion 62 are mounted on the bearing housing 8 shown in FIGS. 10A to C, the formation range of the oil groove 42G of the upper-side halved bearing 42U can include a region where the amount of change in the inner diameter of the bearing holding hole of the bearing housing 8, in particular, in the radius of the half-cylindrical surface 83a of the upper-side housing 81 is the largest. When there is a change in temperature of the bearing housing 8, in the formation range of the oil groove 42G, the amount of change in the gap between the groove bottom surface (inner circumference) of the oil groove 42G and the surface of the second journal portion 62 increases.

In the bearing device 1 of this Example, when there is a change in temperature of the bearing housing 8, oil grooves 42G is formed to include ±45° region θ1, which is a region where the amount of change in gap between the groove bottom surface (inner circumference) of the oil groove 42G and the surface of the journal portion 62 increases. The groove depth D2 of the oil groove 42G at least in ±45° region θ1 is half or less of the depth D1 of the oil groove 41G at the corresponding position in the circumferential direction, and the gap between the groove bottom surface (inner surface) of the oil groove 42G and the surface of the second journal portion 62 is set to be small.

When the temperature of the internal combustion engine is low (for example, −30° C.), the bearing gap between the inner circumferential surface of the second main bearing 42 and the surface of the second journal portion 62 is extremely small since the coefficient of thermal expansion of the upper-side housing 81 and the coefficient of thermal expansion of the second journal portion 62 of the crankshaft 3 made of the Fe alloy are different. During some time immediately after the start of the internal combustion engine, oil supplied from the outside into the oil groove 42G has a low temperature and a high viscosity. When the oil supplied to the oil groove 42G has a high viscosity, oil is unlikely to flow out from the oil groove 42G to the bearing gap. In particular, oil is unlikely to be supplied to the bearing gap between the inner circumferential surface of the lower-side halved bearing 42L and the surface of the second journal portion 62.

In the second main bearing 42 of the bearing device 1 of the Example, even if the oil supplied from the outside into the oil groove 42G has a low temperature and high viscosity, the gap between the groove bottom surface of the oil groove 42G at least in ±45° region θ1 and the surface of the second journal portion 62 is made to be sufficiently small. For that reason, when the internal combustion engine is started, all of oil in the oil groove 42G including oil in the oil groove 42G on the groove bottom surface side is affected by a strong force from the surface of the journal portion 62 which rotates, forcing the oil to be supplied to the rotationally forward side of the journal portion. During this time, sufficient shear force is added to the oil, the temperature of the oil rises promptly, and the viscosity is lowered. Further, the circumferential end portion of the oil groove 42G of the upper-side halved bearing 42U on the rotationally forward side of the second journal portion 62 is open to the circumferential end face 72 of the upper-side halved bearing 42U on the rotationally forward side of the second journal portion 62. Therefore, oil whose viscosity becomes low directly flows into the bearing gap between the inner circumferential surface of the lower-side halved bearing 42L and the surface of the journal portion 62 from the circumferential end portion of the oil groove 42G.

Figure 9:
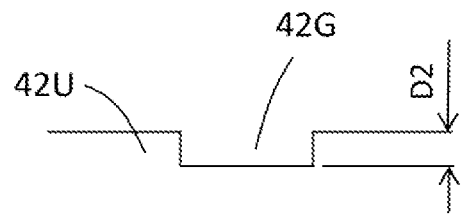
FIG. 9 is a cross-sectional view of the oil groove of the upper-side halved bearing.

As shown in FIG. 9, the oil groove 42G has a flat groove bottom surface in the cross section of the oil groove 42G, and when the oil groove 42G is parallel to the surface of the first journal portion 62, sufficient shearing force is readily added to the oil, which is preferred. Without being limited to a rectangular cross-sectional shape shown in FIG. 9, the sectional shape of the oil groove 42G can be changed to the inverted trapezoidal cross sectional shape or a circular arc cross sectional shape.

The reason why the groove depth D2 of the oil groove 42G is half or less of the groove depth D1 of the oil groove 41G is as follows. The bearing device 1 of the present invention is a bearing device which is suitable for a small internal combustion engine for a passenger car. For example, when the diameter of the journal portion of the crankshaft is 40 to 100 mm, the groove depth D1 of the oil groove 41G is 1 to 2.5 mm. The groove depth D1 of the oil groove 41G is set to be large according to the size of the diameter of the journal portion. For example, when the groove depth D1 of the oil groove 41G is 2.5 mm, the groove depth D2 of the oil groove 42G may be 1.25 mm at a maximum. However, in that case, since the diameter of the journal portion 62 is large, the power of the surface of the journal portion which rotates is large, oil in the oil groove 42G is sufficiently sheared at low temperature, the oil temperature rises early, and resulting in that the viscosity of the oil can be lowered.

Further, in the present invention, since the groove depth D2 is half or less of the groove depth D1 of the oil groove 41G, the internal volume of the oil groove 42G is small. At the time of normal operation of the internal combustion engine, it is possible to reduce the supply amount of oil to the second main bearing 42. Thus, the supply amount of oil to the entire bearing device 1 can be reduced.

Further, when the oil groove depth D2 of the oil groove 42G is more than half the groove depth D1 of the oil groove 41G, the oil in the oil groove immediately after the start of the internal combustion engine is not likely to be shared at low temperatures, the temperature of the oil does not rise early, and the viscosity of the oil is not likely to be lowered. Further, since the internal volume of the oil groove becomes larger, the supply amount of the oil at the time of operation increases.

Further, when the bearing housing 8 has the configuration of a pair of the upper-side and lower-side housings which are made of Fe alloy, or the configuration of a pair of the upper-side and lower-side housings which are made of Al alloy, thermal expansion deformation will not occur to the bearing holding hole of the bearing housing. Thus, effects of the present invention as shown in FIGS. 10A to C cannot be achieved.

EXAMPLE 2

Figure 11:
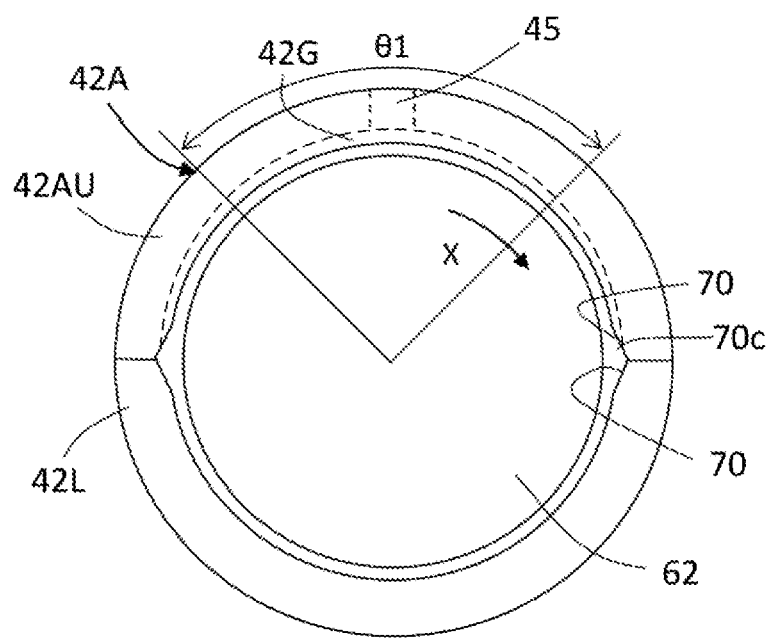
FIG. 11 is a front view of the second main bearing of Example 2.
Figure 12:
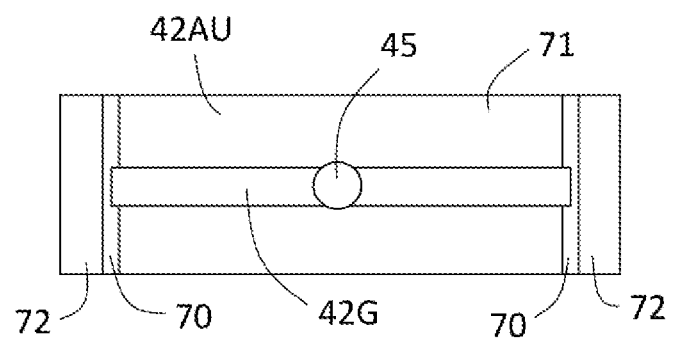
FIG. 12 is a bottom view of the upper-side halved bearing shown in FIG. 11.

Hereinafter, with reference to FIGS. 11 and 12, a second main bearing 42A which includes an upper-side halved bearing 42AU having a form which is different from Example 1 and for supporting the second journal portion 62 will be described. The description of portions which are same as or equivalent to those described in Example 1 is referred to by like numerals.
(Configuration)
First, the configuration will be described. The configuration of the first main bearing 41 for supporting the first journal portion 61 of this Example is the same as that of Example 1. The configuration of the second main bearing 42A is generally the same as that of Example 1 except for the shape of the oil groove 42G of the upper-side halved bearing 42AU.

Specifically, circumferential both end portions of the oil groove 42G of this Example is configured to communicate with the crush relief 70 and 70 at both end portions of the upper-side halved bearing 42AU in the circumferential direction.
(Effects)
At the time of starting the internal combustion engine at cold temperature, oil whose viscosity becomes lower in the oil groove 42G in ±45° region θ1 of the upper-side halved bearing 42AU is early supplied to the inner circumferential surface 71 of the lower-side halved bearing 42L through the gap between the crush relief 70 on the rotationally forward side of the second journal portion 62 of the upper-side halved bearing 42AU on the rotationally forward side of the second journal portion 62 and the crush relief 70 on the rotationally backward side of the second journal portion 62 of the lower-side halved bearing 42L, and the surface of the second journal portion 62, from the circumferential end portion of the oil groove 42G on the rotationally forward side of the second journal portion 62 (in the direction of arrow X in FIG. 11), and the amount of oil to be supplied increased.

If the circumferential end portion of the oil groove 42G on the rotationally forward side of the second journal portion 62 does not communication with the crush relief 70 of the upper-side halved bearing 42AU on the rotationally forward side of the second journal portion 62 (beyond the scope of the present invention), the supply of oil to the inner circumferential surface 71 of the lower-side halved bearing 42L is delayed, and the amount of oil to be supplied is also reduced.

EXAMPLE 3

Hereinafter, with reference to FIGS. 13 and 14, a second main bearing 42B which includes an upper-side halved bearing 42BU having a form which is different from Example 1 and 2, and for supporting the second journal portion 62 will be described. The description of portions which are same as or equivalent to those described in Example 1 and 2 is referred to by like numerals.
(Configuration)
First, the configuration will be described. The configuration of the first main bearing 41 for supporting the first journal portion 61 of this Example is the same as that of Example 1. The configuration of the second main bearing 42B is generally the same as that of Example 1 except for the shape of the oil groove 42G of the upper-side halved bearing 42BU.

Figure 13:
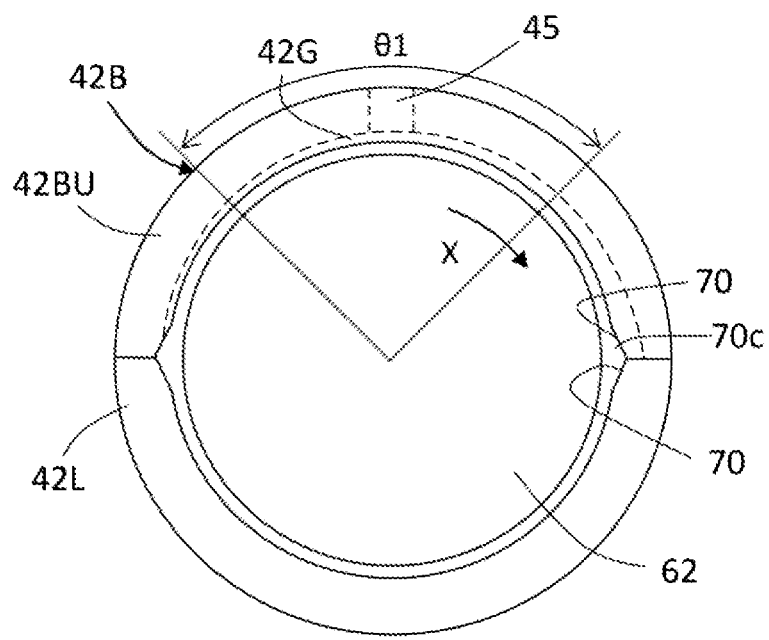
FIG. 13 is a front view of the second main bearing of Example 3.
Figure 14:
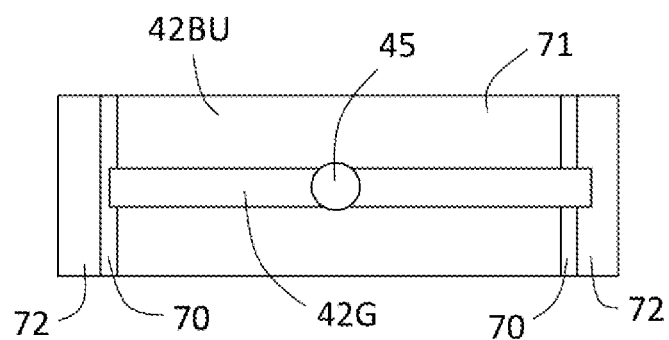
FIG. 14 is a bottom view of the upper-side halved bearing shown in FIG. 13.

Specifically, as shown in FIG. 13, the groove depth D2 of the oil groove 42G of this Example is configured to be minimum at the circumferential end face 72 of the oil groove 42G on the rotationally backward side of the journal portion 62 of the crankshaft, and increase toward the rotationally forward side of the journal portion 62 of the crankshaft.

As with Example 3, when the groove depth D2 of the oil groove 42G varies in the circumferential direction, the groove depth D2 of the oil groove 42G at least in ±45° region of the upper-side halved bearing 42BU has only to be half or less of the groove depth D1 of the oil groove 41G in ±45° region θ1. Further, the groove depth D2 of the oil groove 42G is, over the circumferential entire length (at any position in the circumferential direction), preferably half or less of the groove depth D1 of the oil groove 41G of the upper-side halved bearing 41U at the corresponding position in the circumferential direction.
(Effects)
At the time of the start of the internal combustion engine, while oil whose viscosity becomes lower in the oil groove 42G in ±45° region θ1 of the upper-side halved bearing 42BU flows toward the circumferential end portion of the oil groove 42G on the rotationally forward side of the second journal portion 62 (arrow X direction in FIG. 13), since the groove depth D2 of oil groove 42G increases toward its circumferential end portion on the rotationally forward side of the second journal portion 62, the flow passage resistance to oil flowing through the oil groove 42G decreases, as compared when the groove depth D2 of the oil groove 42G is constant in the circumferential direction, or when the groove depth D2 of the oil groove 42G decreases toward its circumferential end portion on the rotationally forward side of the second journal portion 62. Therefore, oil is early supplied to the inner circumferential surface of the lower-side halved bearing 42L and the amount of oil to be supplied increased.

EXAMPLE 4

Figure 15:
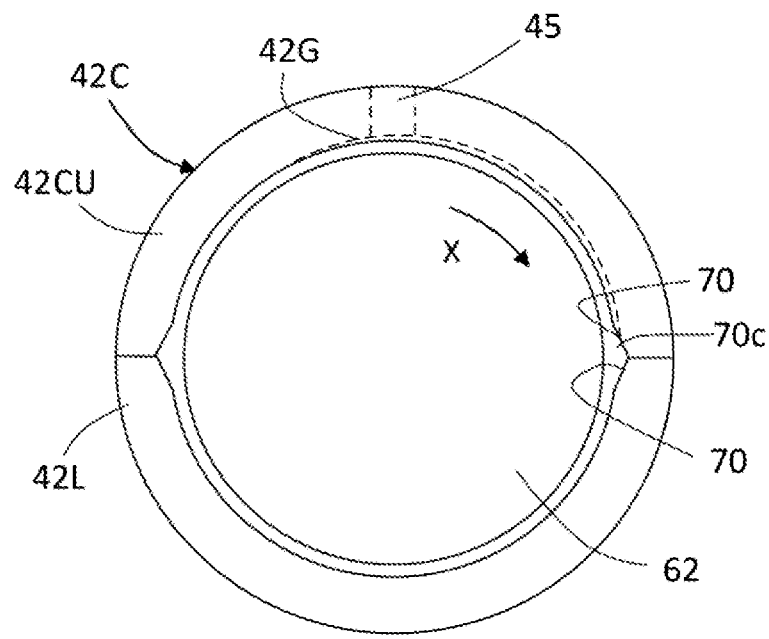
FIG. 15 is a front view of the second main bearing of Example 4.
Figure 16:
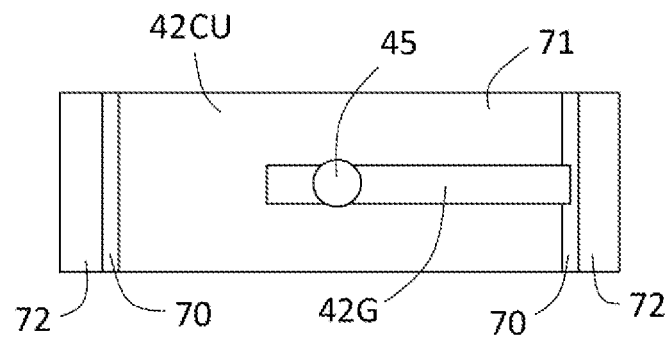
FIG. 16 is a bottom view of the upper-side halved bearing shown in FIG. 15.

Hereinafter, with reference to FIGS. 15 and 16, a second main bearing 42C which includes an upper-side halved bearing 42CU having a form which is different from Example 1 to 3, and for supporting the second journal portion 62 will be described. The description of portions which are same as or equivalent to those described in Example 1 to 3 is referred to by like numerals.
(Configuration)
First, the configuration will be described. The configuration of the first main bearing 41 for supporting the first journal portion 61 of this Example is the same as that of Example 1. The configuration of the second main bearing 42C is generally the same as that of Example 1 to 3 except for the shape of the oil groove 42G of the upper-side halved bearing 42CU.

Specifically, the groove depth D2 of the oil groove 42G of this Example is configured to be maximum at the center of the circumferential length of the oil groove 42G, and decrease toward its both end portions in the circumferential direction. Further, the circumferential end portion of the oil groove 42G on the rotationally backward side of the crankshaft is configured to be positioned at the inner circumferential surface 71 of the upper-side halved bearing 42CU.
(Effects)

In the halved bearing 42CU, the groove depth of the oil groove 42G is configured to be largest at the center of the circumferential length of the oil groove 42G, and decrease toward its circumferential both end portions. Further, the circumferential end portion of the oil groove 42G on the rotationally backward side of the crankshaft is configured to be positioned at the inner circumferential surface 71 of the upper-side halved bearing 42CU. At the time of normal operation of the internal combustion engine including the bearing device of this Example, the halved bearing 42CU can prevent oil supplied to the oil groove 42G from flowing out excessively from the circumferential both end portions of the oil groove 42G. Therefore, the halved bearing 42CU is suitable for the compactness of the oil pump.

EXAMPLE 5

Hereinafter, with reference to FIGS. 17, 18, and 19, a second main bearing 42D which includes an upper-side halved bearing 42DU having a form which is different from Example 1 to 4, and for supporting the second journal portion 62 will be described. The description of portions which are same as or equivalent to those described in Example 1 to 4 is referred to by like numerals.
(Configuration)

First, the configuration will be described. The configuration of the first main bearing 41 for supporting the first journal portion 61 of this Example is the same as that of Example 1. The configuration of the second main bearing 42D is generally the same as that of Example 1 to 4 except for the shape of the oil groove 42G of the upper-side halved bearing 42DU, and the position and the shape of the oil hole 45.

Specifically, the oil hole 45 of this Example is positioned rotationally backward of the second journal portion 62 from the circumferential central position of the upper-side halved bearing 42DU, and the oil groove 42G has a configuration in which its circumferential end portion on the rotationally backward side of second journal portion 62 communicates with the oil hole 45.
(Effects)

In the halved bearing 42DU, the oil hole 45 is positioned rotationally backward of the journal from the central position of the circumferential length of the groove 42G, the circumferential end portion of the oil groove 42G on the rotationally backward side of second journal portion 62 is configured to communicate with the oil hole 45, and the oil introduced into the oil groove 42G from the oil hole 45 readily flows in the oil groove 42G on the rotationally forward side of the journal portion 62. Further the groove bottom surface of 42G is formed (no opening of the oil hole 45G) at the circumferential center portion of the halved bearing 42DU where the amount of change in the gap between the surface of the second journal portion 62 and the rotationally center portion of the halved bearing 42DU is the largest. Thus, effects are heightened, in particular, such that the temperature of the oil increases, and the viscosity is lowered early at the time of the start of the internal combustion engine at cold temperature.

Figure 17:
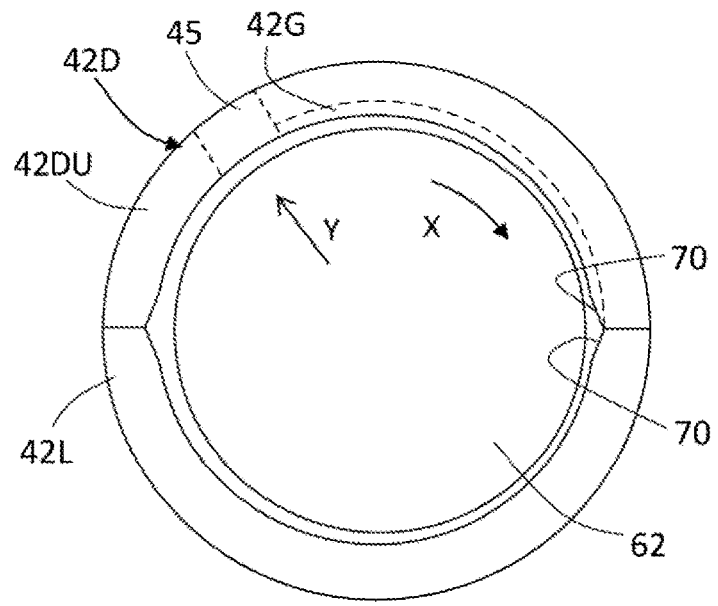
FIG. 17 is a front view of the second main bearing of Example 5.
Figure 18:
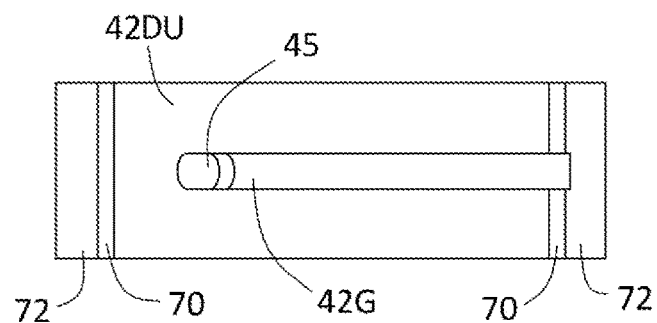
FIG. 18 is a bottom view of the upper-side halved bearing shown in FIG. 17.
Figure 19:
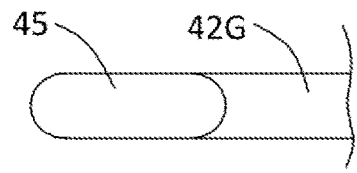
FIG. 19 is a Y arrow view of the oil hole 45 shown in FIG. 18.

Further, as shown in FIG. 19 (showing the shape of the arrow Y direction of the oil hole 45 in FIG. 17), the opening of the oil hole 45 of the upper-side halved bearing 42DU of this Example is made to have an elongated hole shape, its major axis is parallel to the circumferential direction of the upper-side halved bearing 42DU, and its minor axis is parallel to the axial direction of the upper-side halved bearing 42DU. The elongated hole may have a major axis of about 5 to 10 mm and a minor axis of about 3 to 5 mm. However, the size of the elongated hole is one example, and can be another value. Incidentally, the upper-side halved bearing 41U oil hole 45 of the first main bearing 41 can also be the same elongate hole shape as oil hole 45 of the upper-side halved bearing 42DU.

The number of the oil holes 45 of the halved bearing 41U and the halved bearing 42U is not limited to one or may be two or more.

The invention claimed is:

1. A bearing device for a crankshaft of an internal combustion engine comprising:
   a crankshaft having a plurality of journal portions and a plurality of crank pin portion;
   main bearings for supporting the crankshaft; and
   a bearing housing for holding the main bearings,
   wherein the plurality of journal portions comprise a first journal portion having a lubricating oil passage for feeding oil to a crank pin portion of the crankshaft, and a second journal portion without the lubricating oil passage,
   wherein the first journal portion is supported by a first main bearing, and the first main bearing comprises a pair of an upper-side halved bearing and a lower-side halved bearing in half-cylindrical shape,
   wherein the second journal portion is supported by a second main bearing, and the second main bearing comprises a pair of an upper-side halved bearing and a lower-side halved bearing in half-cylindrical shape,
   wherein the bearing housing comprises an upper-side housing made of Al alloy and a lower housing made of Fe alloy, the upper-side housing has a half-cylindrical surface aligned with an outer circumferential surface of the upper-side halved bearing, the lower-side housing has a half-cylindrical surface aligned with an outer circumferential surface of the lower-side halved bearing, the upper-side halved bearings is held on the half-cylindrical surface of the upper-side housing, and the lower-side halved bearings are held on the half-cylindrical surface of the lower-side housing,
   wherein an inner oil passage for supplying oil to the first and second main bearings is formed inside the upper-side housing, and an opening of the inner oil passage is formed on the half-cylindrical surface of the upper-side housing,
   wherein only the upper-side halved bearings out of the pair of halved bearings respectively have oil grooves formed on the inner circumferential surface and at least one oil hole,
   wherein the oil hole penetrates a bearing wall thickness of the upper-side halved bearings, and is open to an outer circumferential surface,
   wherein the opening of the inner oil passage of the upper-side housing and the oil grooves communicate with each other through the oil hole,
   wherein the upper-side and lower-side halved bearings have a crush relief at circumferential both end portions of an inner circumferential surface thereof,
   wherein a range in which the oil groove of the upper-side halved bearing of the first main bearing is formed in a circumferential direction is such that each of circumferential both end portions of the oil groove communicates with the crush relief at a minimum, and is open to a circumferential end face of the upper-side halved bearing at a maximum, wherein when a region of a circumferential angle of ±45° is defined as ±45° region with reference to a circumferential center portion of the upper-side halved bearing, a range in which the oil groove of the upper-side halved bearing of the second main bearing is formed in the circumferential direction includes at least a range of a circumferential angle of 20° within the ±45° region, a circumferential end portion of the oil groove on a rotationally forward side of the journal portion communicates with the crush relief of the upper-side halved bearing on the rotationally forward side of the journal portion at a minimum, and is open to a circumferential end face of the upper-side halved bearing on the rotationally forward side of the journal portion at a maximum, and the circumferential end portion of the oil groove on the rotationally backward side of the journal portion is positioned on a circumferential center portion side of the upper-side halved bearing from a circumferential end face of the upper-side halved bearing on a rotationally backward side of the journal portion, wherein a groove depth at least in the ±45° region of the oil groove of the upper-side halved bearing of the second main bearing is half or less of a groove depth in the ±45° region of the oil groove of the upper-side halved bearing of the first main bearing.

2. The bearing device for a crankshaft of an internal combustion engine according to claim 1, wherein the groove depth of the oil groove of the upper-side halved bearing of the second main bearing is, over a circumferential entire length, half or less of the groove depth of the oil groove of the upper-side halved bearing of the first main bearing at a corresponding position in the circumferential direction.

3. The bearing device for a crankshaft of an internal combustion engine according to claim 1, wherein the groove depth of the oil groove of the upper-side halved bearing of the second main bearing is 0.5 mm at a maximum at least in the ±45° region.

4. The bearing device for a crankshaft of an internal combustion engine according to claim 1, wherein the groove depth of the oil groove of the upper-side halved bearing of the second main bearing becomes smallest at a circumferential end portion on the rotationally backward side of the second journal portion, and increases toward a circumferential end portion on the rotationally forward side of the second journal portion.

5. The bearing device for a crankshaft of an internal combustion engine according to claim 1, wherein the groove depth of the oil groove of the upper-side halved bearing of the second main bearing becomes largest at a center portion of a circumferential length of the oil groove, and decreases toward the circumferential both end portions.

* * * * *